United States Patent
Kuki (10) Patent No.: US 10,173,163 B2
(45) Date of Patent: Jan. 8, 2019

(54) HONEYCOMB STRUCTURE

(71) Applicant: NGK INSULATORS, LTD., Nagoya (JP)

(72) Inventor: Tatsuyuki Kuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 149 days.

(21) Appl. No.: 15/062,568

(22) Filed: Mar. 7, 2016

(65) Prior Publication Data

US 2016/0271547 A1   Sep. 22, 2016

(30) Foreign Application Priority Data

Mar. 19, 2015   (JP) .................................. 2015-056296

(51) Int. Cl.
*B01D 46/24*   (2006.01)
*F01N 3/022*   (2006.01)

(52) U.S. Cl.
CPC ....... *B01D 46/2425* (2013.01); *F01N 3/0222* (2013.01)

(58) Field of Classification Search
CPC .................................................. B28B 3/269
See application file for complete search history.

(56) References Cited

U.S. PATENT DOCUMENTS

| | | | |
|---|---|---|---|
| 2005/0147707 A1 | 7/2005 | Nate et al. | |
| 2005/0241266 A1* | 11/2005 | Ichikawa | ........... B01D 46/0001 52/783.1 |
| 2009/0274867 A1* | 11/2009 | Hiramatsu | ............... B01J 23/63 428/117 |
| 2015/0017343 A1 | 1/2015 | Ando et al. | |

FOREIGN PATENT DOCUMENTS

| | | |
|---|---|---|
| JP | H08-072038 A1 | 3/1996 |
| JP | 2003-285309 A | 10/2003 |
| JP | 2004-156621 A1 | 6/2004 |
| JP | 2008-212842 A1 | 9/2008 |
| WO | 2013/145209 A1 | 10/2013 |

OTHER PUBLICATIONS

Offer of Information Form, Japanese Application No. 2015/056296, dated Sep. 7, 2018 (1 page).
Japanese Office Action (Application No. 2015-056296) dated Oct. 23, 2018 (with English translation).

* cited by examiner

*Primary Examiner* — Amber R Orlando
(74) *Attorney, Agent, or Firm* — Burr & Brown, PLLC (57) ABSTRACT

A honeycomb structure includes a pillar-shaped honeycomb structure body which includes a porous partition wall 1 defining a plurality of cells, and a part of the plurality of cells is an inflow cell of which a portion at the inflow end face side is opened and a portion at the outflow end face side is provided with a plugging portion, the residual cell of the plurality of cells is an outflow cell of which a portion at the inflow end face side is provided with the plugging portion and a portion at the outflow end face side is opened, the inflow cell and the outflow cell are arranged adjacent to each other, and a value of a ratio between a bending strength of a first specimen cut out according to condition (1) and a bending strength of a second specimen cut out according to condition (2) is 1.1 to 2.0.

13 Claims, 3 Drawing Sheets

HONEYCOMB STRUCTURE

The present application is an application based on JP2015-056296 filed on Mar. 19, 2015 with the Japan Patent Office, the entire contents of which are incorporated herein by reference.

BACKGROUND OF THE INVENTION

Field of the Invention

The present invention relates to a honeycomb structure. More specifically, the present invention relates to a honeycomb structure in which a separation of a part of an end is prevented even when a crack is generated in an end face, and further has structure has sufficient isostatic strength.

Description of the Related Art

Since an exhaust gas emitted from an internal combustion engine such as a diesel engine includes a large amount of particulate matter (PM) containing carbon as a main component, which becomes a cause of environmental pollution, a filter for trapping particulate matter is mounted in an exhaust system of the internal combustion engine. As the filter, for example, there is a diesel particulate filter (DPF).

Then, as the filter, there is known a honeycomb structure including a plugging portion (a plugged honeycomb structure) (see Patent Document 1). Specifically, the plugged honeycomb structure includes a honeycomb structure body which includes a porous partition wall defining a plurality of cells serving as fluid through channels, an inflow side plugging portion which is disposed at an inflow end face side that is one end face of a predetermined cell, and an outflow plugging portion which is disposed at an outflow end face side that is the other end of a residual cell.

An exhaust gas flows from the inflow end face of the plugged honeycomb structure to the inside, and particulate matter or the like contained in the exhaust gas is removed by the partition wall. Subsequently, the exhaust gas flows out of the outflow end face. In this way, in the plugged honeycomb structure, the partition wall serves as a filtration layer, and traps particulate matter in the exhaust gas. As a result, the plugged honeycomb structure can purify the exhaust gas.

[Patent Document 1] JP-A-2004-156621

SUMMARY OF THE INVENTION

In the plugged honeycomb structure described in Patent Document 1, a crack (a so-called end face crack) may be generated in the partition wall of the end due to thermal stress and the like generated when soot accumulated inside the plugged honeycomb structure is regenerated or rapidly heated and cooled. Then, in the plugged honeycomb structure described in Patent Document 1, a crack forming direction is not controlled. For that reason, the end face crack is formed in any direction. For that reason, when a crack is formed to surround the plugging portion, the plugging portion surrounded by the crack may separate from the plugged honeycomb structure. In this way, when the plugging portion separates from the plugged honeycomb structure, a problem arises in that the trapping efficiency for particulate matter or the like in the exhaust gas is degraded.

Hence, there has been a demand for the development of the honeycomb structure in which a separation of a part (particularly including the plugging portion) of the end hardly occurs even when a crack is generated in the end face.

The present invention is made in view of the above-described problems of the related art. An object of the present invention is to provide a honeycomb structure in which a separation of a part of an end is prevented even when a crack is generated in the end face, and further has sufficient isostatic strength.

According to the present invention, a honeycomb structure described below is provided.

According to a first aspect of the present invention, a honeycomb structure is provided comprising: a pillared honeycomb structure body which includes a porous partition wall defining a plurality of cells serving as fluid through channels and extending from an inflow end face that is a fluid inflow side end face to an outflow end face that is a fluid outflow side end face, wherein a part of the plurality of cells is an inflow cell in which a portion at the inflow end face side is opened and a portion at the outflow end face side is provided with a plugging portion and the residual cells of the plurality of cells is an outflow cell in which a portion at the inflow end face side is provided with a plugging portion and a portion at the outflow end face side is opened, the inflow cell and the outflow cell are arranged adjacent to each other, and a value of a ratio between a bending strength of a first specimen cut out according to the following condition (1) and a bending strength of a second specimen cut out according to the following condition (2) is 1.1 to 2.0, where condition (1) is set such that a first rectangular area which includes a pair of long sides perpendicular to a first axis that is one axis of axes connecting center points of the respective cells opened to each other in the shortest distance, and a pair of short sides parallel to the first axis is assumed in one end face, and a plate specimen including the plugging portion having the first area as one face is cut out from the honeycomb structure, and condition (2) is set such that a second rectangular area which includes a pair of long sides perpendicular to a second axis that is another axis of the axes, and a pair of short sides parallel to the second axis is assumed in the same end face as in condition (1), and a plate specimen including the plugging portion having the second area as one face is cut out from the honeycomb structure.

According to a second aspect of the present invention, the honeycomb structure according to the first aspect is provided, wherein a lower limit value of the value of the ratio between the bending strength of the first specimen and the bending strength of the second specimen is 1.2.

According to a third aspect of the present invention, the honeycomb structure according to the second aspect is provided, wherein the lower limit value of the value of the ratio between the bending strength of the first specimen and the bending strength of the second specimen is 1.3.

According to a fourth aspect of the present invention, the honeycomb structure according to any one of the first to third aspects is provided, wherein an upper limit value of the value of the ratio between the bending strength of the first specimen and the bending strength of the second specimen is 1.9.

According to a fifth aspect of the present invention, the honeycomb structure according to the fourth aspect is provided, wherein the upper limit value of the value of the ratio between the bending strength of the first specimen and the bending strength of the second specimen is 1.8.

According to a sixth aspect of the present invention, the honeycomb structure according to any one of the first to fifth aspects is provided, wherein when three or more axes exist, an axis having the largest bending strength is set to the first axis and an axis having the smallest bending strength is set to the second axis and the value of the ratio between the bending strength of the first specimen and the bending strength of the second specimen is 1.1 to 2.0.

According to a seventh aspect of the present invention, the honeycomb structure according to any one of the first to sixth aspects is provided, wherein at least one of the inflow cell and the outflow cell is square in an open end in the end face.

According to an eighth aspect of the present invention, the honeycomb structure according to any one of the first to seventh aspects is provided, wherein a material of the partition wall of the honeycomb structure body is at least one selected from the group consisting of cordierite, silicon carbide, a silicon-silicon carbide-based composite material, mullite, alumina, aluminum titanate, silicon nitride, and a silicon carbide-cordierite-based composite material.

According to a ninth aspect of the present invention, the honeycomb structure according to any one of the first to eighth aspects is provided, wherein an open area of the inflow cell is different from an open area of the outflow cell.

According to a tenth aspect of the present invention, the honeycomb structure according to any one of the first to ninth aspects is provided, wherein the partition wall of the honeycomb structure body includes an intersection portion formed by the intersection of the partition walls and a thickness in a first axial direction is the same as a thickness in a second axial direction at the intersection portion.

According to an eleventh aspect of the present invention, the honeycomb structure according to any one of the first to ninth aspects is provided, wherein the partition wall of the honeycomb structure body includes an intersection portion formed by the intersection of the partition walls and a thickness in a first axial direction is different from a thickness in a second axial direction at the intersection portion. bending strength of the second specimen is 1.8.

In the honeycomb structure of the present invention, the value of the ratio between the bending strength of the first specimen cut out according to the predetermined condition (1) and the bending strength of the second specimen cut out according to the predetermined condition (2) is 1.1 to 2.0. For that reason, in the honeycomb structure of the present invention, the end face crack forming direction is controlled, and since it is possible to prevent the end face crack from being formed to surround the plugging portion, it is possible to prevent the separation of a part (particularly including the plugging portion) of the end even when a crack is generated in the end face. Further, the honeycomb structure of the present invention has sufficient isostatic strength.

DETAILED DESCRIPTION OF THE PRESENT INVENTION

Hereinafter, embodiments of the present invention will be described. The present invention is not limited to the embodiments described below, and the embodiments can be modified and improved appropriately based on the general knowledge of the person skilled in the art without departing from the spirit of the present invention. Of course, these modifications and improvements are also included in the scope of the present invention.

Figure 1:
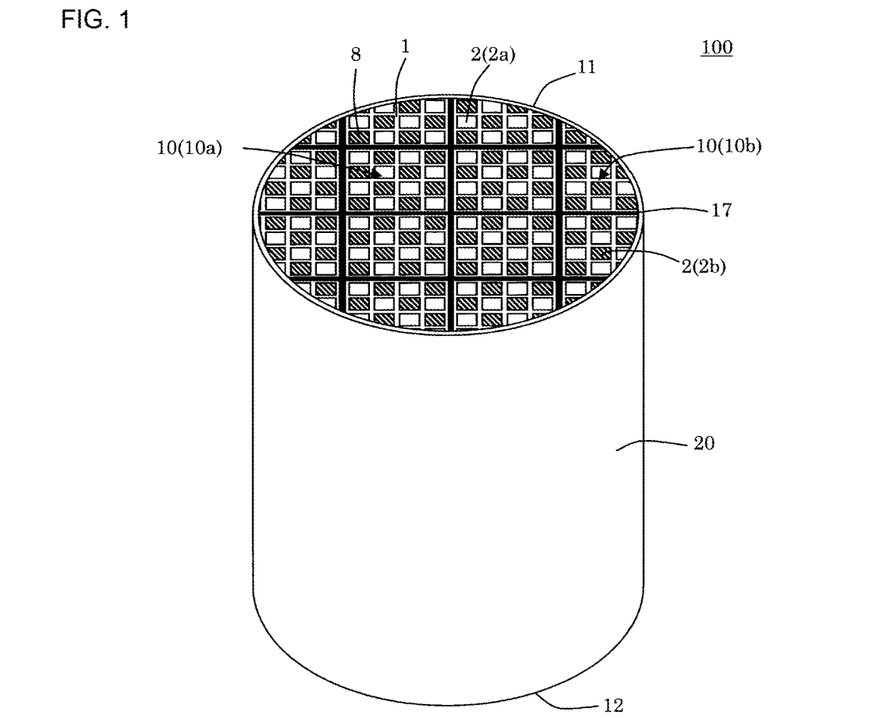
FIG. 1 is a perspective view schematically showing an embodiment of a honeycomb structure of the present invention.

(1) Honeycomb Structure:

An embodiment of a honeycomb structure of the present invention is a honeycomb structure 100 shown in FIG. 1. The honeycomb structure 100 includes a pillar-shaped honeycomb structure body 10 including a porous partition wall 1, and a plugging portion 8. The partition wall 1 defines a plurality of cells 2 serving as fluid through channels and extending from an inflow end face 11 as a fluid inflow side end face to an outflow end face 12 as a fluid outflow side end face. Further, in the honeycomb structure 100, a part of the plurality of cells 2 is an inflow cell 2a in which a portion at the side of the inflow end face 11 is opened and a portion at the side of the outflow end face 12 is provided with a plugging portion 8. Then, in the honeycomb structure 100, the residual cells of the plurality of cells 2 is an outflow cell 2b in which a portion at the inflow end face 11 side is provided with the plugging portion 8 and a portion at the outflow end face 12 side is opened. In the honeycomb structure 100, the inflow cell 2a and the outflow cell 2b are arranged adjacent to each other while being partitioned by the partition wall 1. Further, in the honeycomb structure 100, a value of a ratio between a bending strength of a first specimen 31 (see FIG. 4) cut out according to the following condition (1) and a bending strength of a second specimen cut out according to the following condition (2) is 1.1 to 2.0.

Condition (1): A first rectangular area 45 including a pair of long sides 41 and a pair of short sides 43 is assumed in one end face (see FIG. 2). Note that in one end face the pair of long sides 41 are a pair of sides perpendicular to a first axis 61 that is one axis of axes connecting the center points of the respective cells opened to each other in the shortest distance. In one end face, the pair of short sides 43 are a pair of sides parallel to the first axis 61. Then, a plate specimen including a plugging portion having the first area 45 as one face is cut out from the honeycomb structure 100.

Condition (2): A second rectangular area 55 including a pair of long sides 51 perpendicular to a second axis 62 that is another axis of the axes, and a pair of short sides 53 parallel to the second axis 62 is assumed in the above end face at the same side as in condition (1) (see FIG. 2). Then, a plate specimen including a plugging portion having the second area 55 as one face is cut out from the honeycomb structure 100.

Figure 2:
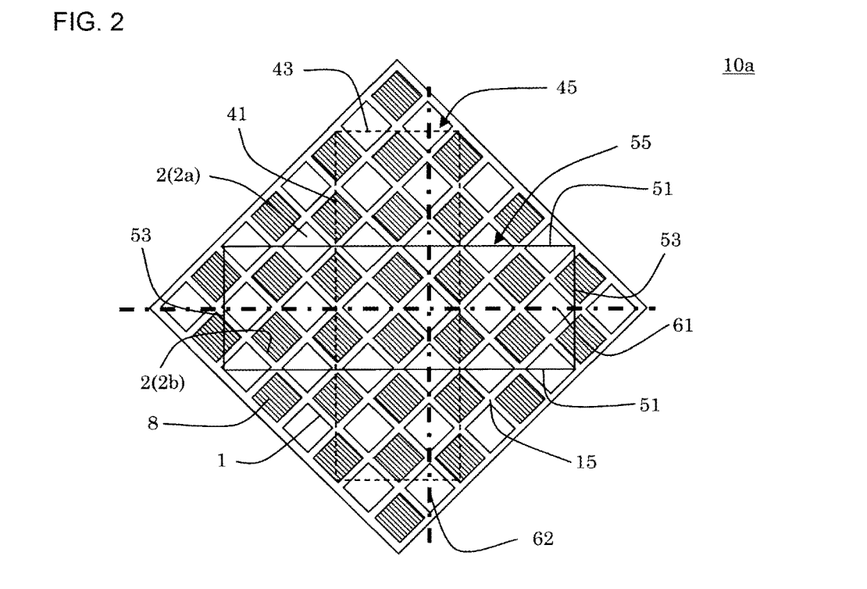
FIG. 2 is a plan view schematically showing a part of one end face in the embodiment of the honeycomb structure of the present invention.

Note that the "connecting center points of the respective cells to each other in the shortest distance" in condition (1) means that a straight short line connecting the center points is used when connecting the center points of the adjacent open cells in the plurality of cells opened (the open cells) in one end face. For that reason, when the shape of the open end is a square cell, a straight line extending on the diagonal line (axis) of the square cell is depicted as shown in FIG. 2.

In such a honeycomb structure 100, a value of a ratio between the bending strength of the first specimen cut out according to a predetermined condition and the bending strength of the second specimen cut out according to a predetermined condition (2) is 1.1 to 2.0. For that reason, the end face crack forming direction of the honeycomb structure 100 is controlled. That is, in the honeycomb structure (the plugged honeycomb structure) of the related art, the end face crack forming direction has not been controlled and the end face crack has been formed in any direction. For that reason, when the end face crack is formed to surround the plugging portion, the plugging portion surrounded by the end face crack may separate from the plugged honeycomb structure. Hence, in the present invention, it is possible to prevent the end face crack from being formed to surround the plugging portion by the control of the end face crack forming direction. As a result, even when a crack is generated in the end face, the separation of a part of the end face (particularly including the plugging portion 8) is prevented. Further, sufficient isostatic strength can be obtained within the above-described range.

In condition (1), when three or more axes connecting the center points of the respective cells opened in the shortest distance exist in one end face, the axis having the largest bending strength is set as the first axis and the axis having the smallest bending strength is set as the second axis. In this case, it is desirable that the value of the ratio between the bending strength of the first specimen and the bending strength of the second specimen be 1.1 to 2.0. That is, for example, when the shape of the open end in the end face is the hexagonal cell, three axes can be selected. In this case, the axis having the largest bending strength is set as the first axis in condition (1) and the axis having the smallest bending strength is set as the second axis in condition (1). Then, the first area and the second area each having a rectangular shape are assumed respectively, and the first specimen and the second specimen that are the plate specimens are cut out. At this time, it is desirable that the value of the ratio between the bending strength of the first specimen and the bending strength of the second specimen be 1.1 to 2.0.

Figure 4:
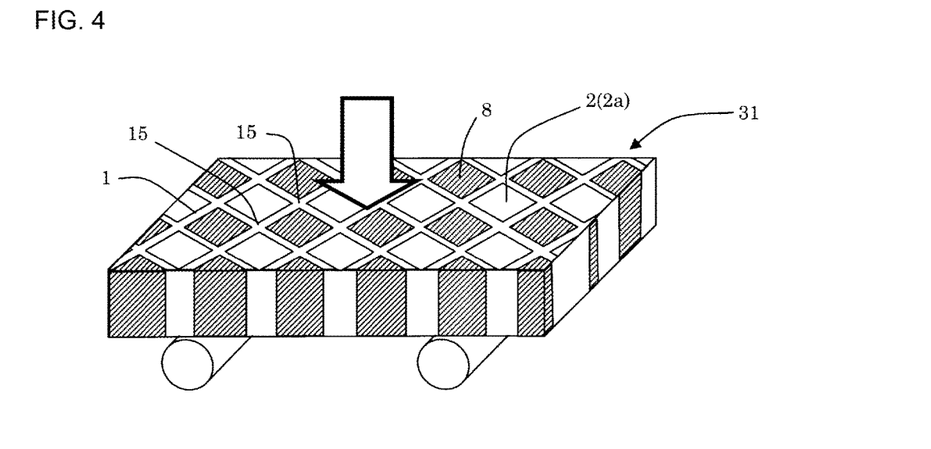
FIG. 4 is a schematic view schematically showing a state where a bending strength of a specimen cut out from the embodiment of the honeycomb structure of the present invention is measured.

FIG. 1 is a perspective view schematically showing an embodiment of a honeycomb structure of the present invention. FIG. 2 is a plane view schematically showing a part of one end face in the embodiment of the honeycomb structure of the present invention. Note that FIG. 2 shows one center segment (a plugged honeycomb fired body 10a) constituting the honeycomb structure 100. FIG. 4 is a schematic view schematically showing a state where the bending strength of the specimen cut out from the embodiment of the honeycomb structure of the present invention is measured. The arrow in FIG. 4 means that an external force is applied to the specimen in a direction indicated by the arrow. The bending strength of the first specimen and the bending strength of the second specimen are values measured by a "bending test" based on JIS R 1601.

In the honeycomb structure 100, the lower limit value of the value of the ratio of the bending strength of the second specimen (not shown) to the bending strength of the first specimen 31 is desirably 1.2 and more desirably 1.3. When the lower limit value is set to this value, it is possible to further prevent the separation of a part of the end even when the end face is cracked.

In the honeycomb structure 100, the upper limit value of the value of the ratio between the bending strength of the first specimen 31 and the bending strength of the second specimen (not shown) is desirably 1.9 and more desirably 1.8. When the upper limit value is set to this value, degradation in isostatic strength is suppressed.

(1-1) Honeycomb Structure Body:

The thickness of the partition wall is desirably 100 to 500 µm, more desirably 120 to 400 µm, and particularly desirably 150 to 350 µm. When the thickness of the partition wall is less than the lower limit value, there is a possibility that the pressure loss increases. When the thickness of the partition wall exceeds the upper limit value, there is a possibility that the isostatic strength is insufficient.

The porosity of the partition wall is desirably from 30 to 80%, more desirably from 35 to 75%, and particularly desirably 40 to 70%. When the porosity is less than the lower limit value of the porosity, there is a possibility that the pressure loss increases. When the porosity exceeds the upper limit value of the porosity, there is a possibility that the isostatic strength is insufficient. The porosity is a value measured by a mercury porosimeter.

As the material of the partition wall, ceramic is desirable. At least one selected from the group consisting of cordierite, silicon carbide, a silicon-silicon carbide-based composite material, mullite, alumina, aluminum titanate, silicon nitride, and a silicon carbide-cordierite-based composite material is desirable because of an excellent strength and excellent heat resistance. When the partition wall is formed of such a material, the strength and the heat resistance of the honeycomb structure are excellent.

Figure 3:
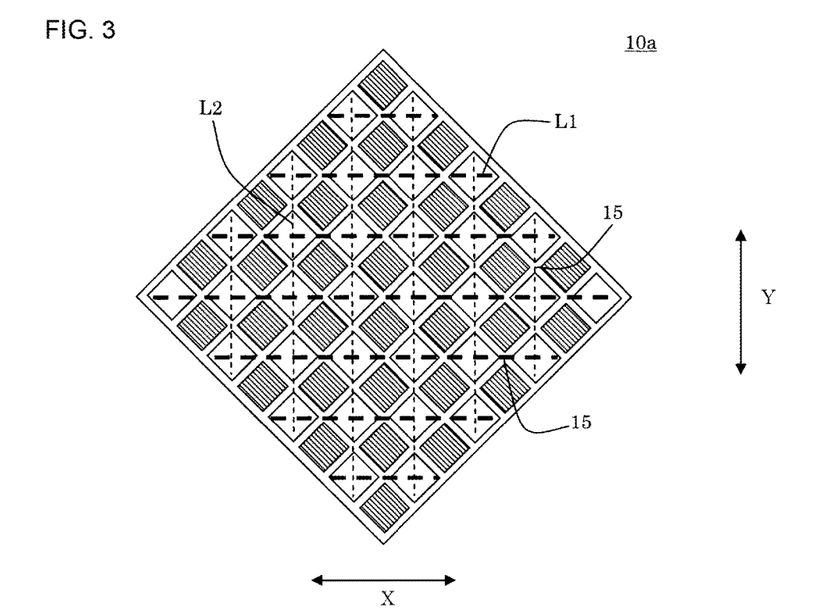
FIG. 3 is a plan view schematically showing a part of one end face in the embodiment of the honeycomb structure of the present invention.

The partition wall 1 includes an intersection portion 15 formed by the intersection of the partition walls 1. Then, it is desirable to form the honeycomb structure 100 so that the thickness in the first axial direction X (see FIG. 3) is the same as the thickness in the second axial direction Y (see FIG. 3) in the intersection portion 15. When such a condition is satisfied, an increase in pressure loss can be suppressed. FIG. 3 is a plan view schematically showing a part of one end face in the embodiment of the honeycomb structure of the present invention, where the one end face is the same as the end face shown in FIG. 2.

In such a case, the following methods may be used so that the value of the ratio between the bending strength of the first specimen and the bending strength of the second specimen satisfies a predetermined range. That is, there is a method in which a plurality of back holes formed on an end side to which a ceramic forming raw material is supplied is placed at a predetermined positions in a die used in a honeycomb formed body making step described below. That is, it is possible to use a die in which a back hole is formed at a position corresponding to the intersection portion located on the first axis and a back hole is not formed at a position corresponding to an intersection portion located on the second axis. According to such a die, since the back hole exists at the intersection point of the partition walls, the strength of the formed intersection portion is smaller than the strength of the other intersection portions. For that reason, the bending strength of the specimen can satisfy a predetermined range.

Further, the following method can be employed so that the value of the ratio between the bending strength of the first specimen and the bending strength of the second specimen satisfies a predetermined range. That is, there is a method of differently setting the thickness in the first axial direction and the thickness in the second axial direction of the intersection portion. Specifically, the ratio between the thickness in the first axial direction of the intersection portion and the thickness in the second axial direction of the intersection portion may be 1.1 to 2.0 times. The "thickness in the first axial direction of the intersection portion" means the thickness in the extension direction X of the first axis 61 (see FIG. 2) (that is, the straight line L1) (see FIG. 3). The "thickness in the second axial direction of the intersection portion" means the thickness in the extension direction Y of the second axis 62 (see FIG. 2) (that is, the straight line L2) (see FIG. 3). With such a configuration, the bending strength of the honeycomb structure increases.

The inflow cell may have a polygonal shape such as a triangular shape, a square shape, a hexagonal shape, and an octagonal shape in a cross-section orthogonal to the cell extending direction. Further, the outflow cell may have a polygonal shape such as a triangular shape, a square shape, a hexagonal shape, and an octagonal shape in a cross-section orthogonal to the cell extending direction. Further, the corner portion may be chamfered in a circular-arc shape or a linear shape. FIGS. 2 and 3 show a part (the plugged honeycomb fired body 10*a*) of the honeycomb structure 100 in which the open end of the inflow end face 11 in the inflow cell 2*a* and the outflow cell 2*b* is formed in a square shape. Further, FIG. 5 shows a part (a plugged honeycomb fired body 110*a*) of a honeycomb structure 101 in which the open end of the inflow cell 2*a* is formed in a square shape and the open end of the outflow cell 2*b* is formed in an octagonal shape in the inflow end face 11.

Figure 5:
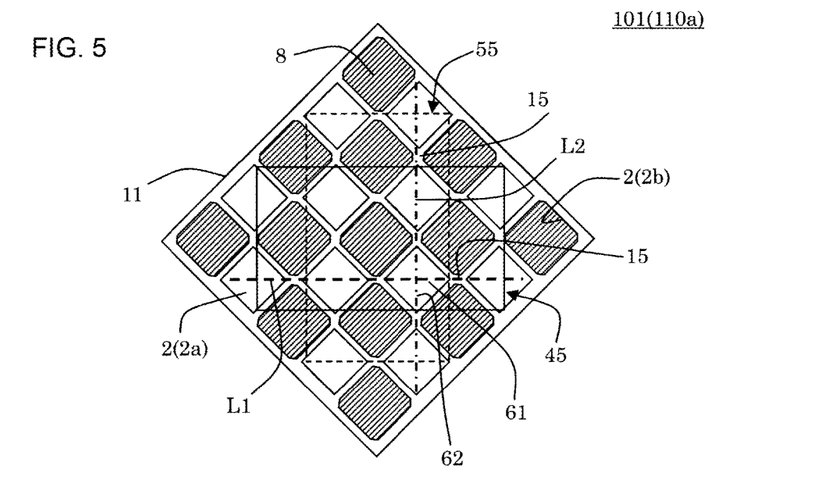
FIG. 5 is a plan view schematically showing a part of one end face in another embodiment of a honeycomb structure of the present invention.

In FIG. 5, the first area 45 and the second area 55 assumed in the above-described conditions (1) and (2) are depicted on the inflow end face 11 of the plugged honeycomb fired body 10*a*. FIG. 5 is a plan view schematically showing a part of one end face in another embodiment of a honeycomb structure of the present invention.

The open area of the inflow cell and the open area of the outflow cell may have different sizes from each other. In this way, it is possible to decrease the pressure loss in a state where soot or ash is accumulated.

Specifically, it is desirable that the open area of the outflow cell be 1.1 to 3.0 times the open area of the inflow cell.

The shape of the honeycomb structure body can be a round pillar shape, an oval pillar shape, or a polygonal pillar shape such as a triangular pillar shape and a square pillar shape.

The length of the honeycomb structure in the cell extending direction can be set to 50 to 500 mm.

The honeycomb structure 100 may further include a circumferential wall 20 (see FIG. 1) at the side face of the honeycomb structure body 10.

(1-2) Plugging Portion:

The honeycomb structure of the present invention includes plugging portions. A material of these plugging portions may be the same as the material of the partition wall.

Further, the depth of the plugging portion can be appropriately determined.

(2) Honeycomb Structure Manufacturing Method:

A honeycomb structure manufacturing method of the present embodiment will be described. First, a kneaded material for manufacturing the honeycomb structure is prepared, and the kneaded material is formed by using a predetermined die, so as to manufacturing a honeycomb formed body (a forming step). Subsequently, the obtained honeycomb formed body (or the honeycomb dried body after drying if necessary) is subjected to plugging, so as to form a plugging portion (a plugging portion forming step). Subsequently, the honeycomb structure can be obtained by firing (a honeycomb structure manufacturing step).

Hereinafter, each manufacturing step will be described in more detail.

(2-1) Forming Step:

First, in a forming step, a ceramic forming raw material containing a ceramic raw material is formed so as to form a honeycomb formed body defining the plurality of cells serving as fluid through channels.

As the ceramic raw material contained in the ceramic forming raw material, a material including at least one selected from the group consisting of a cordierite forming raw material, silicon carbide, a silicon-silicon carbide-based composite material, mullite, alumina, aluminum titanate, silicon nitride, and a silicon carbide-cordierite-based composite material is desirable. Note that the cordierite forming raw material means a ceramic raw material which is mixed so as to have a chemical composition in which silica is contained in a range of 42 to 56 mass %, alumina is contained in a range of 30 to 45 mass %, and magnesia is contained in a range of 12 to 16 mass % and which becomes cordierite by firing.

It is desirable to prepare the ceramic forming raw material by mixing a dispersing medium, an organic binder, an inorganic binder, a pore former, a surfactant, or the like with the ceramic raw material. The composition ratio of the respective raw materials is not particularly limited, and it is desirable to use a composition ratio in accordance with the structure and the material of the honeycomb structure to be manufactured.

When the ceramic forming raw material (hereinafter, may simply be referred to as a "forming raw material") is formed, first, desirably, the forming raw material is kneaded into a kneaded material and the kneaded material is formed in a honeycomb shape by using a die. A method of kneading the forming raw material so as to form a kneaded material is not particularly limited. An example of the method can include a method using a kneader and a vacuum pugmill. A method of forming a kneaded material so as to form the honeycomb formed body is not particularly limited, and a forming method known in the related art such as extrusion and injection molding can be used. A favorable example of the method can include a method of extruding a kneaded material by using a die having a desired cell shape, a desired partition wall thickness, and a desired cell density so as to form the honeycomb formed body.

In the die used herein, a die base may include a plurality of back holes through which the forming raw material is introduced and a slit which communicates with the back holes. The die has the back holes formed in a portion corresponding to all intersection portions of the partition wall. Then, there are two kinds of back holes having different sizes, and the adjacent back holes having different sizes are alternately disposed. In this step, such a die can be used. Note that the back hole is not limited to the above. For example, there can be obtained an effect that the small back hole does not exist and the large back holes have different sizes. That is, the back holes may be placed every other intersection point (the back holes may be disposed in a zigzag shape).

Further, a kneaded material can be extruded by using the die such that the thickness in the first axial direction and the thickness in the second axial direction of the intersection portion in the partition wall of the obtained honeycomb structure are different from each other. That is, a kneaded material can be extruded by using the die such that the corner portion of the cell is chamfered in a cross-section orthogonal to the cell extending direction. The "thickness in the first axial direction and the thickness in the second axial direction of the intersection portion are different" specifically means that any one of the thickness in the first axial direction and the thickness in the second axial direction of the intersection portion may be large. That is, the thickness in the first axial direction of the intersection portion may be larger than the thickness in the second axial direction of the intersection portion, and the thickness in the second axial direction of the intersection portion may be larger than the thickness in the first axial direction of the intersection portion. Note that herein, the thickness in the first axial direction is larger than the thickness in the second axial direction in a part of the intersection portion, and the thickness in the second axial direction is not larger than the thickness in the first axial direction in the other part of the intersection portion.

The shape of the honeycomb formed body is not particularly limited. Examples of the shape of the honeycomb formed body may include a round pillar shape, and a polygonal pillar shape of which a cross-section orthogonal to the center axis has an oval shape, a racetrack shape, a triangular shape, a square shape, a pentagonal shape, a hexagonal shape, or an octagonal shape.

The obtained honeycomb formed body may be subjected to drying. The drying method is not particularly limited. However, examples of the drying method can include hot air drying, microwave drying, dielectric drying, decompression drying, vacuum drying, and freeze drying. Among these, it is desirable to perform the dielectric drying, the microwave drying, or the hot air drying alone or in combination thereof.

(2-2) Plugging Portion Forming Step:

Next, a plugging portion is formed in the honeycomb formed body (the honeycomb dried body when the drying step is employed). Specifically, first, the inflow end face of the honeycomb formed body is subjected to masking such that the inflow cell 2a is covered, and the end (the inflow end) subjected to the masking is immersed into plugging slurry so as to fill the open end of the outflow cell not subjected to the masking with the plugging slurry. Subsequently, the outflow end face of the honeycomb formed body is subjected to masking such that the outflow cell 2b is covered, and the end (the outflow end) subjected to the masking is immersed into plugging slurry so as to fill the open end of the inflow cell not subjected to the masking with the plugging slurry. In this way, the honeycomb formed body having the plugging portion formed therein can be obtained.

As the plugging slurry, a material known in the related art that is used as a material of the plugging portion of the honeycomb structure can be appropriately selected to be used.

(2-3) Honeycomb Structure Manufacturing Step:

Next, a honeycomb fired body is obtained by firing the obtained honeycomb formed body.

Note that it is desirable to calcinate the honeycomb formed body before firing (main firing) the honeycomb formed body. The calcinating is performed for degreasing, and the method is not particularly limited as long as an organic material (an organic binder, a dispersing agent, a pore former, or the like) in the honeycomb formed body can be removed. In general, since the combustion temperature of the organic binder is about 100 to 300° C. and the combustion temperature of the pore former is about 200 to 800° C., heating for about 3 to 100 hours at about 200 to 1000° C. in the oxidizing atmosphere is desirable as the calcinating condition.

An appropriate condition may be selected for the firing (main firing) of the honeycomb formed body. For example, when the cordierite forming raw material is used, the firing temperature is desirably from 1410 to 1440° C. Further, it is desirable to keep the firing time at the maximum temperature for 4 to 6 hours.

EXAMPLES

Hereinafter, the present invention will be described in detail based on Examples, but the present invention is not limited to these Examples.

Example 1

A mixed powder was obtained by mixing 80 mass % of silicon carbide powder and 20 mass % of Si powder. A forming raw material was obtained by adding a binder, a pore former, and water to the mixed powder. Next, the forming raw material was kneaded so as to prepare a round pillar-shaped kneaded material.

Next, a honeycomb formed body having a round pillar shape on the whole and including a cell having a square open end in an end face was obtained by extruding the kneaded material by using a die having a predetermined shape.

Note that the die used herein includes back holes formed at portions corresponding to all intersection portions in the partition wall. Here, two kinds of back holes having different sizes were used. Then, the die was formed so that the back holes having different sizes were alternately disposed. The honeycomb structure in which the value of the ratio between the bending strength of the first specimen and the bending strength of the second specimen is 1.1 to 2.0 can be manufactured by using the die.

Next, the honeycomb formed body was subjected to drying by a microwave dryer, and was further subjected to drying by a hot air dryer to be completely dried. Subsequently, both end faces of the honeycomb formed body were cut and adjusted to have a predetermined dimension.

A plugging portion was formed in the honeycomb formed body after the drying (honeycomb dried body). Specifically, first, the inflow end face of the honeycomb dried body was subjected to masking such that the inflow cell (the predetermined cell) was covered, and the end (the inflow end) subjected to the masking was immersed into plugging slurry so as to fill the open end of the outflow cell not subjected to the masking with the plugging slurry. Subsequently, the outflow end face of the honeycomb dried body is subjected to masking such that the outflow cell (the residual cell) was covered, and the end (the outflow end) subjected to the masking was immersed into plugging slurry so as to fill the open end of the inflow cell not subjected to the masking with the plugging slurry. Subsequently, the honeycomb formed body having the plugging portion formed therein was subjected to drying by a hot air dryer. In this way, the plugged honeycomb dried body was obtained.

Next, degreasing was formed on the plugged honeycomb dried body by heating at 450° C. for 5 hours. Further, firing was performed on the plugged honeycomb dried body by heating at 1425° C. for 7 hours, and a square pillar-shaped plugged honeycomb fired body was obtained (the end face had a square shape in which the length of one side was 36 mm). Such sixteen plugged honeycomb fired bodies were manufactured.

Next, the obtained plugged honeycomb fired bodies were adjacently placed so that the side faces faced each other (the obtained plugged honeycomb fired bodies were disposed according to the arrangement of four units by four units lengthwise and breadthwise) and were bonded to each other by the bonding material, and a plugged honeycomb bonded body was manufactured.

Next, grinding was performed on the circumferential portion of the plugged honeycomb bonded body so as to form a circular shape in a cross-section perpendicular to the cell extending direction in the plugged honeycomb bonded body and subsequently a ceramic raw material was applied on the outermost circumference so as to form a circumferential wall. In this way, the honeycomb structure was manufactured. Note that the manufactured honeycomb structure includes a center segment having the plugged honeycomb fired bodies 10a disposed at the center according to the arrangement of two units by two units lengthwise and breadthwise at the center and a circumferential segment having twelve plugged honeycomb fired bodies 10b placed on the circumference of the center segment (see FIG. 1).

In the honeycomb structure, the porosity of the partition wall was 60%. Further, the thickness of the partition wall was 0.3 mm. The diameter of the end face was 144 mm and the length in the cell extending direction was 152 mm. Further, the cell density was 46.5 units/cm². Further, the depth of the plugging portion was 5 mm. The thickness of the bonding material (the bonding layer 17 (see FIG. 1)) was 1 mm. The thickness of the circumferential wall was 1 mm.

The "bending strength" of the obtained honeycomb structure was evaluated by the following method. The result is shown in Table 1.

(Bending Strength)

A plate specimen (having a thickness of 3 mm× a width of 7 mm× a length of 40 mm) was cut out in a direction orthogonal to a direction in which the cell penetrated the honeycomb structure as a longitudinal, and the bending strength was calculated by a "bending test" based on JIS R 1601. Note that two honeycomb structures manufactured under the same condition were prepared, and two kinds of specimens (a first specimen and a second specimen) were cut out as follows from these honeycomb structures. Then, the bending strength of each of the two kinds of specimens was measured. The result is shown in Table 1.

The first specimen was cut out as follows from each of four plugged honeycomb fired bodies constituting the center segment. First, as shown in FIG. 2, the first rectangular area 45 including the pair of long sides 41 and the pair of short sides 43 was assumed in one end face. Note that in one end face the pair of long sides 41 are a pair of sides perpendicular to the first axis 61 that is one axis of orthogonal axes connecting the center points of the respective cells opened in the shortest distance. Further, in one end face the pair of short sides 43 are a pair of sides parallel to the first axis 61. Then, a specimen including a plugging portion having the first area 45 as one face was cut out from the honeycomb structure (the plugged honeycomb fired body). Four plugged honeycomb fired bodies of the center segment were set as segments A to D (see Table 2).

The second specimen was cut out as follows from each of four plugged honeycomb fired bodies constituting the center segment of the honeycomb structure having the same structure as the structure of the honeycomb structure from which the first specimen was cut out (that is, the honeycomb structure manufactured by the same method). First, the second area 55 is assumed in the same end face as the end face in which the first area 45 of the first specimen was assumed (see FIG. 2). The second area 55 is a rectangular area including the pair of long sides 51 perpendicular to the second axis 62 that is another axis of the orthogonal axes, and the pair of short sides 53 parallel to the second axis 62. Then, a plate specimen having the second area 55 as one face was cut out from the honeycomb structure (the plugged honeycomb fired body). Such four plugged honeycomb fired bodies were set as segments A to D similarly to the case of the first specimen (see Table 2).

In Table 1, A to I in the section of the "die" indicate the type of the die. Die "A" indicates a die having a structure in which the adjacent back holes have the same size. Dies "B" to "I" indicate dies having a structure in which the adjacent back holes have different sizes. Then, Dies "B" to "I" indicate a structure in which the ratio of the sizes of the adjacent back holes increases sequentially.

In Table 1, the section of "MX/MY" indicates a value of the "bending strength of the first specimen"/the "bending strength of the second specimen."

In Table 2, the section of the "number of cracks surrounding the plugging portion" indicates the number of a group of cracks. Here, the "group of cracks" means a crack group including a plurality of cracks generated in the entire intersection portion surrounding the cell having the plugging portion disposed therein.

TABLE 1

|  | DIE | BENDING STRENGTH OF FIRST SPECIMEN | BENDING STRENGTH OF SECOND SPECIMEN | MX/MY | OPEN AREA OF INFLOW CELL/ OPEN AREA OF OUTFLOW CELL |
|---|---|---|---|---|---|
| COMPARATIVE EXAMPLE 1 | A | 100 | 100 | 1.0 | 1.8 |
| EXAMPLE 1 | B | 100 | 91 | 1.1 | 1.8 |
| EXAMPLE 2 | C | 100 | 82 | 1.2 | 1.8 |
| EXAMPLE 3 | D | 100 | 77 | 1.3 | 1.8 |
| EXAMPLE 4 | E | 100 | 65 | 1.5 | 1.8 |
| EXAMPLE 5 | F | 100 | 57 | 1.8 | 1.8 |
| EXAMPLE 6 | G | 100 | 53 | 1.9 | 1.8 |
| EXAMPLE 7 | H | 100 | 50 | 2.0 | 1.8 |
| COMPARATIVE EXAMPLE 2 | I | 100 | 45 | 2.2 | 1.8 |

TABLE 2

| | SEGMENT A | | SEGMENT B | | SEGMENT C | | SEGMENT D | | TOTAL NUMBER OF CRACKS | RATIO OF CRACK IN SECOND AXIAL DIRECTION (%) | NUMBER OF CRACKS SURROUNDING PLUGGING PORTION |
|---|---|---|---|---|---|---|---|---|---|---|---|
| | NUMBER OF CRACKS IN FIRST AXIAL DIRECTION | NUMBER OF CRACKS IN SECOND AXIAL DIRECTION | NUMBER OF CRACKS IN FIRST AXIAL DIRECTION | NUMBER OF CRACKS IN SECOND AXIAL DIRECTION | NUMBER OF CRACKS IN FIRST AXIAL DIRECTION | NUMBER OF CRACKS IN SECOND AXIAL DIRECTION | NUMBER OF CRACKS IN FIRST AXIAL DIRECTION | NUMBER OF CRACKS IN SECOND AXIAL DIRECTION | | | |
| COMPARATIVE EXAMPLE 1 | 2 | 3 | 1 | 0 | 0 | 1 | 3 | 2 | 12 | 50 | 2 |
| EXAMPLE 1 | 1 | 3 | 1 | 2 | 1 | 4 | 0 | 2 | 14 | 79 | 0 |
| EXAMPLE 2 | 0 | 2 | 0 | 2 | 0 | 3 | 1 | 3 | 11 | 91 | 0 |
| EXAMPLE 3 | 0 | 4 | 0 | 3 | 0 | 3 | 0 | 2 | 12 | 100 | 0 |
| EXAMPLE 4 | 0 | 2 | 0 | 4 | 0 | 3 | 0 | 3 | 12 | 100 | 0 |
| EXAMPLE 5 | 0 | 3 | 0 | 3 | 0 | 5 | 0 | 2 | 13 | 100 | 0 |
| EXAMPLE 6 | 0 | 4 | 0 | 5 | 0 | 3 | 0 | 4 | 16 | 100 | 0 |
| EXAMPLE 7 | 0 | 5 | 0 | 6 | 0 | 5 | 0 | 4 | 20 | 100 | 0 |
| COMPARATIVE EXAMPLE 2 | 0 | 6 | 0 | 5 | 0 | 7 | 0 | 8 | 26 | 100 | 0 |

The "regeneration limit test," the "presence and absence of separation of the plugging portion," and the "isostatic strength" of the obtained honeycomb structure were evaluated by the following methods.

(Regeneration Limit Test)

Figure 6:
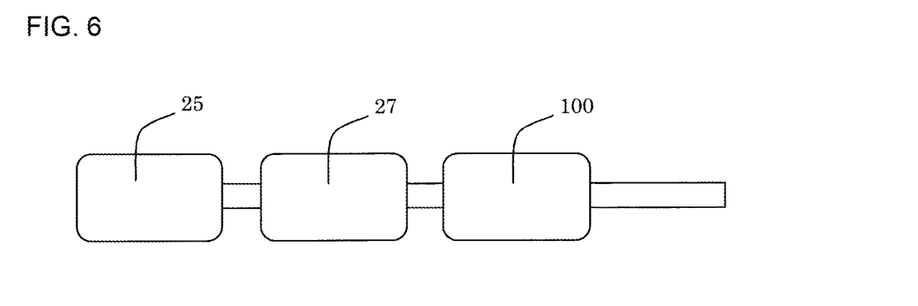
FIG. 6 is a schematic view schematically showing a device that performs a regeneration limit test.

As shown in FIG. 6, a diesel engine 25 having a displacement of 2000 cc was prepared and a flow-through honeycomb catalyst body 27 was placed directly below the engine 25. Further, the honeycomb structure 100 was placed behind the honeycomb catalyst body 27. The flow-through honeycomb catalyst body (DOC) was a flow-through honeycomb catalyst body coated with an oxidized catalyst. The flow-through honeycomb catalyst body had a diameter of an end face of 144 mm and a length in the cell extending direction of 76 mm. Further, the thickness of the partition wall was 0.1 mm and the cell density was 62 units/cm².

Next, a diesel engine was used at an engine rotation speed of 2000 rpm and an engine torque of 60 Nm, and soot was accumulated inside the honeycomb structure. The total amount of the soot accumulated was 25 g.

Next, a post injection was performed for 90 seconds at an engine rotation speed of 1700 rpm and a torque of 80 Nm. In this way, the temperature of the exhaust gas at the inflow end face of the honeycomb structure was raised to 650° C. Subsequently, this state was continued for 200 seconds at an engine rotation speed of 1000 rpm in a non-torque state. Then, the presence and absence of generation of cracks were visually checked in four plugged honeycomb fired bodies of the center segment. At this time, the number of cracks generated in the direction parallel to the second axis (the second axial direction) and the number of cracks generated in the direction parallel to the first axis (the first axial direction) were separately measured. The result is shown in Table 2.

In addition, the "number of cracks surrounding the plugging portion" was measured. That is, the number of crack groups including a plurality of cracks generated in the entire intersection portion surrounding the cell having the plugging portion disposed therein was measured. The result is shown in Table 2.

(Number of Separated Plugging Portions)

After the above-described regeneration limit test, the number of the separated plugging portions (including the ones with the partition wall) was counted by checking the presence and absence of separation of a part of the end of the honeycomb structure. The result is shown in Table 3.

(Isostatic Strength)

The isostatic strength was measured based on an isostatic breakdown strength test specified by M505-87 of Japanese automobile standard organization (JASO) published by Society of Automotive Engineers of Japan, Inc. The isostatic breakdown strength test is a test in which the honeycomb structure is put into a rubber cylindrical container, the container is closed with an aluminum plate, and the container is subjected to an isostatic pressurizing compression in water. That is, the isostatic breakdown strength test is a simulation test in which a compression load is applied when the circumferential face of the honeycomb structure is held by a can body. The isostatic strength measured by the isostatic breakdown strength test is indicated by a pressurization value (MPa) at the time of breakdown of the honeycomb structure. Then, the isostatic strength ratio was calculated based on the isostatic strength of the honeycomb structure of Comparative Example 1.

When the isostatic strength ratio was 0.9 or more, "OK" was determined, and when the isostatic strength ratio was less than 0.9, "NG" was determined. The result is shown in Table 3.

TABLE 3

|  | NUMBER OF SEPARATED PLUGGING PORTIONS | ISOSTATIC STRENGTH RATIO | |
|---|---|---|---|
|  |  | RATIO | EVALUATION |
| COMPARATIVE EXAMPLE 1 | 1 | 100 | OK |
| EXAMPLE 1 | 0 | 101 | OK |
| EXAMPLE 2 | 0 | 99 | OK |
| EXAMPLE 3 | 0 | 100 | OK |
| EXAMPLE 4 | 0 | 100 | OK |
| EXAMPLE 5 | 0 | 99 | OK |
| EXAMPLE 6 | 0 | 95 | OK |
| EXAMPLE 7 | 0 | 91 | OK |
| COMPARATIVE EXAMPLE 2 | 0 | 78 | NG |

Examples 2 to 7 and Comparative Examples 1 and 2

The "regeneration limit test," the "presence and absence of separation of the plugging portion" and the "isostatic strength" were evaluated along with the evaluation of the "bending strength" similarly to Example 1 except that the changes as shown in Tables 1 and 2 were made. The result is shown in Tables 2 and 3.

From Tables 2 and 3, in the honeycomb structures of Examples 1 to 7, it is understood that the separation of a part of the end is prevented even when a crack is generated in the end face as compared to the honeycomb structures of Comparative Examples 1 and 2. Further, it is understood that the honeycomb structures of Examples 1 to 7 have sufficient isostatic strength.

The honeycomb structure of the present invention can be employed as a filter that purifies an exhaust gas emitted from an automobile.

DESCRIPTION OF REFERENCE NUMERALS

1: partition wall, 2: cell, 2a: inflow cell, 2b: outflow cell, 8: plugging portion, 10: honeycomb structure body, 10a, 110a: plugged honeycomb fired body, 11: inflow end face, 12: outflow end face, 15: intersection portion, 17: bonding layer, 20: circumferential wall, 25: diesel engine, 27: flow-through honeycomb catalyst body, 31: first specimen, 41, 51: long side, 43, 53: short side, 45: first area, 55: second area, 61: first axis, 62: second axis, 100, 101: honeycomb structure, L1, L2: straight line

What is claimed is:

1. A honeycomb structure comprising:
a pillared honeycomb structure body which includes porous partition walls defining a plurality of cells serving as fluid through channels and extending from an inflow end face that is a fluid inflow side end face to an outflow end face that is a fluid outflow side end face,
wherein at least one of the plurality of cells is an inflow cell in which a portion at the inflow end face side is opened and a portion at the outflow end face side is provided with a plugging portion and residual cells of the plurality of cells are outflow cells in which a portion at the inflow end face side is provided with a plugging portion and a portion at the outflow end face side is opened,
the inflow cell and the outflow cell are arranged adjacent to each other, and
a value of a ratio between a bending strength of a first specimen cut out according to the following condition (1) and a bending strength of a second specimen cut out according to the following condition (2) is 1.1 to 2.0,
where condition (1) is set such that a first rectangular area which includes a pair of long sides perpendicular to a first axis that is one axis of axes connecting center points of respective cells opened to each other in the shortest distance, and a pair of short sides parallel to the first axis is assumed in one end face, and a first plate specimen including the plugging portion having the first rectangular area as one face is cut out from the honeycomb structure, and
condition (2) is set such that a second rectangular area which includes a pair of long sides perpendicular to a second axis that is another axis of the axes, and a pair of short sides parallel to the second axis is assumed in the same end face as in condition (1), and a second plate specimen including the plugging portion having the second rectangular area as one face is cut out from the honeycomb structure,
wherein the first plate specimen and second plate specimen are the same size.

2. The honeycomb structure according to claim 1, wherein a lower limit value of the value of the ratio between the bending strength of the first specimen and the bending strength of the second specimen is 1.2.

3. The honeycomb structure according to claim 2, wherein the lower limit value of the value of the ratio between the bending strength of the first specimen and the bending strength of the second specimen is 1.3.

4. The honeycomb structure according to claim 1, wherein an upper limit value of the value of the ratio between the bending strength of the first specimen and the bending strength of the second specimen is 1.9.

5. The honeycomb structure according to claim 2, wherein an upper limit value of the value of the ratio between the bending strength of the first specimen and the bending strength of the second specimen is 1.9.

6. The honeycomb structure according to claim 3, wherein an upper limit value of the value of the ratio between the bending strength of the first specimen and the bending strength of the second specimen is 1.9.

7. The honeycomb structure according to claim 4, wherein the upper limit value of the value of the ratio between the bending strength of the first specimen and the bending strength of the second specimen is 1.8.

8. The honeycomb structure according to claim 1, wherein three or more axes exist, an axis of a specimen having the largest bending strength is set to the first axis and an axis of a specimen having the smallest bending strength is set to the second axis and the value of the ratio between the bending strength of the first specimen and the bending strength of the second specimen is 1.1 to 2.0.

9. The honeycomb structure according to claim 1,
wherein at least one of the inflow cell and the outflow cell is square in an open end in the end face.

10. The honeycomb structure according to claim 1,
wherein a material of the porous partition walls of the pillared honeycomb structure body is at least one selected from the group consisting of cordierite, silicon carbide, a silicon-silicon carbide-based composite material, mullite, alumina, aluminum titanate, silicon nitride, and a silicon carbide-cordierite-based composite material.

11. The honeycomb structure according to claim 1,
wherein an open area of the inflow cell is different from an open area of the outflow cell.

12. The honeycomb structure according to claim 1,
wherein the porous partition walls of the pillared honeycomb structure body includes an intersection portion formed by the intersection of the porous partition walls and a thickness in a first axial direction is the same as a thickness in a second axial direction at the intersection portion.

13. The honeycomb structure according to claim 1,
wherein the porous partition walls of the pillared honeycomb structure body includes an intersection portion formed by the intersection of the porous partition walls and a thickness in a first axial direction is different from a thickness in a second axial direction at the intersection portion.

* * * * *